Patented July 30, 1929.

1,722,392

UNITED STATES PATENT OFFICE.

ANTON PICAREFF, OF NEW YORK, N. Y., ASSIGNOR TO ANTON PICAREFF ART STUDIOS, INC., OF NEW YORK, N. Y., A CORPORATION OF NEW YORK.

COLORING AGENT FOR FABRICS AND METHOD OF MAKING THE SAME.

No Drawing. Application filed May 14, 1927. Serial No. 191,551.

The present invention relates to an improvement in coloring agents for fabrics and method of making the same. One object has been to provide a coloring agent which may be supplied in a wide range of colors and which may be applied to silk and other fabrics more easily and with better decorative effect than has been possible with previously known preparations intended for a similar purpose. In the coloring or decorating of silks and other fabrics with paints, dyes and the like, the effort and skill of the artist or artisan have frequently been offset or materially limited by undesirable characteristics inherent in the medium or coloring agent with which he has worked. For example, it has been difficult to get clear definition of line and demarkation of boundaries between contiguous or adjacent colored areas. Another difficulty is that, where a single color is used as of a dye or paint, the coloring medium has a tendency to spread irregularly or "run" into adjoining uncolored portions of the fabric. Various attempts have been made to overcome this difficulty, as for example by impregnating certain predetermined portions of the fabric with a wax or other paint or dye resistant substance or "stopper" and removing it by solvents after application of the color to the impregnated portions. A coloring agent incorporating the features of my invention may be applied freely at ordinary temperatures to a fabric such as silk, without spreading through the fibers thereof beyond the edge of the surface to which the coloring agent is directly applied. Furthermore, a paint or dye of one color may be applied directly contiguous to that of another color even while the latter remains moist without intermingling of the colors along the line of contiguity. Thus, my improved coloring agent or medium acts both as a paint or dye and as a stopper to be effectively used with paints, dyes and the like of widely varying composition and characteristics.

My improved method of making the above referred to coloring agent and stopper for fabrics includes the step of dissolving a dye stuff thoroughly in boiling water, maintaining the solution at boiling temperature for two to three minutes, then adding a fixing agent. After the solution including the fixing agent has cooled, I add a suitable substance which becomes viscous in solution such as glue, mucilage, Irish moss, gelatin, gum tragacanth, gum acacia and the like, although for the best results I prefer to use select gum acacia.

The dye stuffs hereinbefore referred to may be either basic or acid. If basic, the fixing agent will preferably be tannic acid, and if the dye stuff is acid the fixing agent will preferably be glacial acetic acid.

Although the ingredients in my improved compound may be brought together in varied proportion within reasonable limits, a preferred mixture and one which has been used successfully is made as follows: ¼ oz. of dye stuff is added to 16½ ozs. of boiling water and stirred therein until thoroughly dissolved. This solution is maintained at boiling temperature from two to three minutes and then, if the dye stuff is basic, I add 60 drops of a solution consisting of equal parts by weight of tannic acid and water. If the dye stuff is acid, instead of the tannic acid as a fixing agent, I add 10 drops of 95% solution glacial acetic acid. Whether the fixing agent be tannic acid or acetic acid, the solution is then allowed to cool. Thereafter I add to each ounce of the solution ½ oz. of white select acacia gum in powder form and allow it to become thoroughly dissolved. The compound consisting of the hereinabove mentioned ingredients mixed and compounded as and in the proportions specified is then allowed to stand in a covered container for twenty-four hours after which time it may be successfully used for the intended purpose. In this consistency, the compound will be most effectively employed as a so-called stopper, that is as a medium or agent with which to define the outline of ornamental or other significant forms to be rendered as to their substantial area in a similar or different kind or color of paint, dye or the like applied to the fabric. As so used, the stopper itself has and retains the characteristic color of the dye stuff utilized in its compounding. It is also possible by a slight variation to use the above described compound of stopper consistency as the basis of a coloring agent adapted particularly for application over more extensive areas than those usually covered in demarking or outlining a pattern or design. For this purpose, to each ounce and one-half of stopper, I add ½ oz. of the compound as it is constituted prior to the addition of the viscous substance or gum acacia. Thereafter, this mixture may be diluted with water to any desired practical extent to be used as a dye or paint for application to fabrics such as silk and the like.

After the coloring agent has been applied either as a stopper defining boundaries of the design, or as a dye or paint covering areas within or outside of said boundaries, or as both, the fabric is subjected to heat for a period of three hours or more, preferably in a chamber containing steam and at a temperature not less than 180 degrees Fahrenheit and then washed in clear water and ironed. Any stiffness of portions of the fabric resulting from the application and drying of the stopper will be removed by the subsequent heating and washing operations without, however, removing or diminishing the effectiveness of the dye color which remains fast in the fabric.

Although I have mentioned the utility of the so-called stopper compound more particularly in connection with use of the coloring agent, paint, or dye derived therefrom as described, said stopper compound may be used also as a stopper where other kinds of coloring agents are used. For example, many known coloring agents or mediums are satisfactory from the viewpoint of color or hue characteristics and permanency. Such mediums may be employed for coloring areas bounded or stopped by suitable applications of my stopping medium, regardless of the character of the solvent or vehicle in which the color medium is in solution or suspension. It is preferable, however, to utilize my improved compound with appropriate variation both as a stopper and as a paint or dye, inasmuch as the ingredients and methods of application can be standardized to produce equally successful results for all colors and all fabrics.

While the compound hereinabove described is referred to as a coloring agent or medium for fabrics, it is contemplated that other and appropriate and valuable uses for it will be found from time to time.

I claim as my invention:

1. A coloring agent for fabrics consisting of an acid dye stuff and a viscous substance in an aqueous solution and glacial acetic acid.

2. A coloring agent for fabrics consisting of an acid dye stuff and gum acacia in an aqueous solution and glacial acetic acid.

3. A coloring agent for fabrics consisting of water 16½ oz., a dye stuff ¼ oz., gum acacia 8½ ozs., and of 95% glacial acetic acid solution, 10 drops.

4. The method of making a coloring agent for fabrics which includes dissolving a dye stuff in boiling water, adding thereto a fixing agent, allowing the mixture to cool and then adding a viscous substance soluble in said mixture.

5. The method of making a coloring agent for fabrics which includes dissolving a dye stuff in boiling water, adding thereto glacial acetic acid, allowing the mixture to cool, and then adding thereto a soluble gum.

6. The method of making a coloring agent for fabrics which includes dissolving ¼ oz. of dye stuff in 16½ ozs. of boiling water, adding thereto a fixing agent, allowing the mixture to cool, and then adding thereto 8½ ozs. of gum acacia.

In testimony whereof, I have signed my name to this specification this 13th day of May, 1927.

ANTON PICAREFF.